VARIABLE WEB FEED CONTROL MEANS IN SELECTIVE PRINTING MACHINES
Filed Nov. 28, 1961
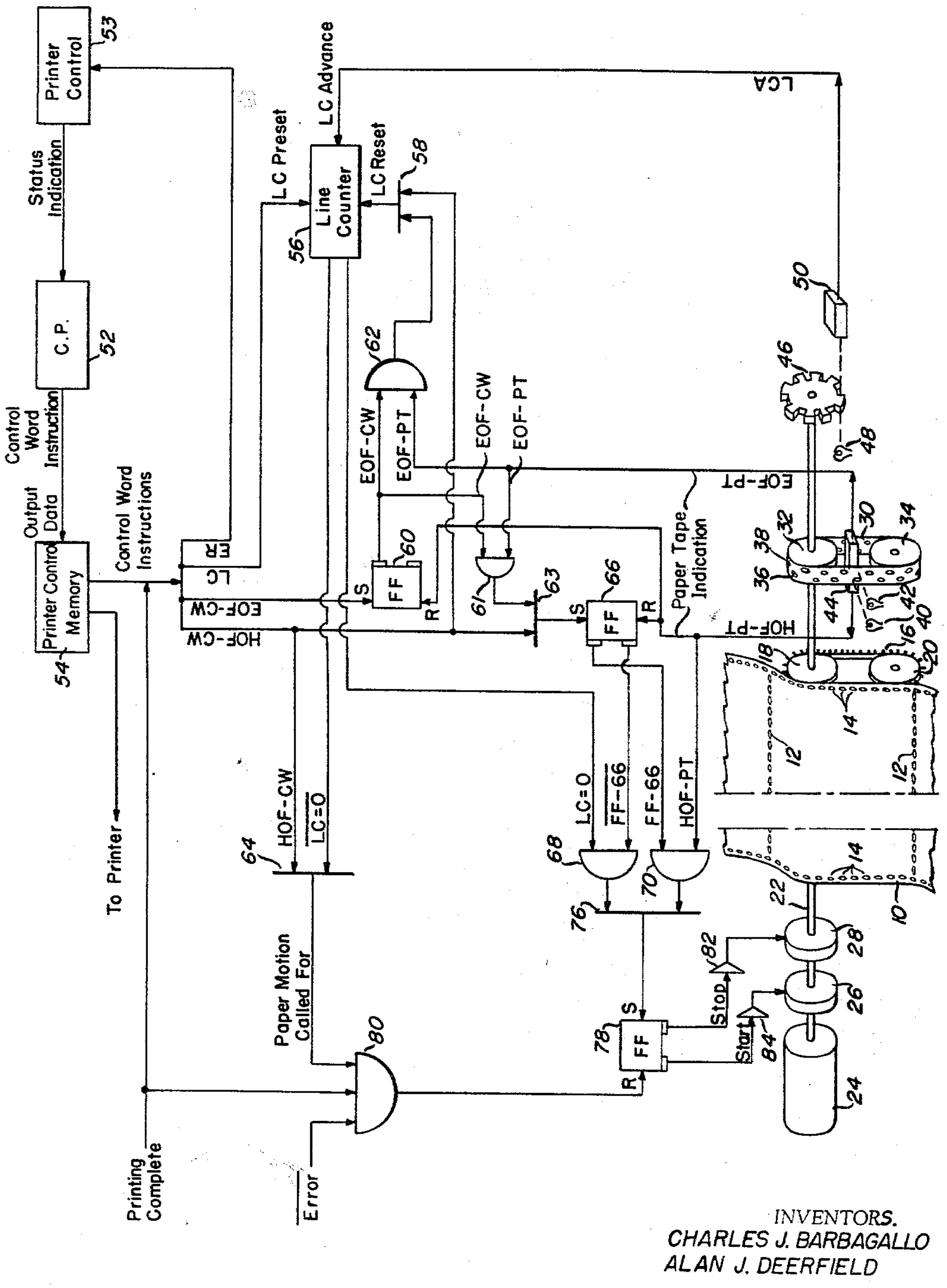
INVENTORS.
CHARLES J. BARBAGALLO
ALAN J. DEERFIELD
BY Fred Jacob
ATTORNEY United States Patent Office 3,174,610

Patented Mar. 23, 1965

3,174,610

VARIABLE WEB FEED CONTROL MEANS IN SELECTIVE PRINTING MACHINES

Charles J. Barbagallo, Needham, and Alan J. Deerfield, Franklin, Mass., assignors to Honeywell Inc., a corporation of Delaware Filed Nov. 28, 1961, Ser. No. 155,344
12 Claims. (Cl. 197—133)

The present invention relates in general to new and improved apparatus for formating data by transferring it to selected positions on a data storage medium, as determined by the relative motion of said medium and a data transfer station. In particular, the present invention relates to formating apparatus adapted to operate in conjunction with a data transfer device for moving an associated data storage medium to selected data transfer positions in accordance with a desired data format.

Although the invention is applicable wherever it is required to store data in a selected format on a storage medium, it will be described and illustrated with reference to a preferred embodiment wherein it operates in conjunction with a computer-controlled printer to print output data on an associated movable paper web in accordance with a desired vertical print format by advancing the web to selected print line positions. An example of a computer output circuit and associated printer wherein the present invention may find employment is disclosed in a copending application by Charles J. Barbagallo and Richard D. Pasciuto, Serial Number 113,351, filed May 29, 1961, and assigned to the assignee of the present application.

In a system such as that described in the above-mentioned copending application, printing occurs on a line-by-line basis, the paper web remaining stationary while the printing of a line is in progress. It is generally desired to print the output data in accordance with a predetermined print format which may or may not repeat during subsequent printings. For example, the same form may be used repeatedly when bills are printed so that the vertical line spacing follows a predetermined repeating pattern. In such a case, the movement of the paper web may be governed by a permanent control medium, either on the web itself, or separate therefrom and moving in synchronism therewith. Appropriate indicia on the control medium may serve to regulate the movement of the paper web. For example, a common drive shaft may drive the paper web and an endless paper tape, the latter containing punched holes indicative of the lines at which the movement of the paper web is to be arrested for printing.

It will be apparent that such a technique is economical only when a large number of identical forms is to be printed. When this is not the case, i.e. when changes within a given print format are required, or when changes are required of the successive forms to be printed, frequent changeovers of the paper tape are necessary each of which requires an interruption of the printing operation. In addition to requiring the attention of the operator in attendance, such changeovers are sufficiently time-consuming to cause the associated computer whose output data is to be printed to idle to some extent. When the cost of computer operation is considered, it will be clear that any delays, however occasioned, are a matter of prime economic concern.

Not only must the number of identical forms to be printed be large in order for an operation that uses paper tape which completely determines the print format to become economical, but it is further necessary to print such forms consecutively. Thus, a further limitation is imposed on the operation of the computer which, by limiting the flexibility of the latter, may under certain conditions, enforce its idleness.

The above-mentioned operation is further inflexible insofar as print errors can be corrected only with difficulty. Where an incorrectly printed line is to be crossed out and a new line is to be printed below, the predetermined format provided by the paper tape will not be applicable to print subsequent forms. In such a case the intervention of the operator is again required.

Presently available formating schemes sometimes employ separate formating instructions for each form that is to be printed, such instructions alone determining the print format and being received in association with the computer output data. Although such a technique permits a great variety of different forms to be printed in succession and thus affords greater flexibility than is available with a fixed format paper tape, it necessitates an appreciable amount of time on the part of the programmer who sets up the computer program and it invariably requires additional computer time to perform the necessary programming routines.

The major disadvantage of this technique, however, resides in the fact that it fails to take account directly of the status of the paper web. In actual practice the paper web is rarely continuous but consists of a succession of sheets interconnected with each other along perforated edges which permit the web to be folded in zig-zag fashion. Unless account is taken of the size of the sheets, portions of the print forms may appear isolated on a separate sheet. For example, a situation may occur where the individual items of a bill which is to be printed take up the entire space normally alloted for printing on one sheet, i.e. they run to the end of the form on that sheet. If the printing procedure were to be continued, the sum total would appear on the subsequent sheet. Such a situation is evidently undesirable and can be avoided only if the programmer keeps accurate track of the space available on each sheet. In the instant case, he could program so that the total follows the individual bill items and appears subsequent to the end of the form on the sheet in question at the expense of the lower margin. Such programming, however, requires the expenditure of considerable programming effort.

A situation may occur where the paper web for some reason is not at the position where it should be. Where vertical programming is entirely dependent on programmed instructions, there is no possibility of indicating such a variation. Under these conditions the formating process may not proceed in the manner for which it is programmed thereby compromising the reliability of the entire operation.

It is a primary object of this invention to provide formating apparatus which overcomes the foregoing disadvantages.

It is another object of this invention to provide formating apparatus which is flexible in application and reliable in operation.

It is a further object of this invention to provide formating apparatus which is jointly controlled by the advance of a movable data storage medium and by formating instructions received with the data to be printed.

It is an additional object of this invention to provide formating apparatus which readily permits changes not only in the type of format of the data which is to be stored, but within a given format itself.

It is still another object of this invention to provide formating apparatus which is both flexible in application and reliable in operation.

It is a further object of this invention to provide formating apparatus which is simple and economical in construction and which requires a minimum of servicing time.

The present invention attains the foregoing objects by formating under the joint control of programmed instructions and of positional indications of the movable data storage medium. In the preferred embodiment described and illustrated herein, the invention is applied to the vertical formating of computer-derived output data that is to be printed on a movable paper web. Although a great deal of flexibility is possible as to the particular format used and with respect to variations within a given format, strictly repetitive forms may be programmed for automatic printing dependent on the position of the paper web. However, at the programmer's option processes which are normally initiated upon the occurrence of the aforesaid positional web indications may be suppressed under certain conditions by means of programmed instructions. It will also be clear that the reliability of the apparatus is enhanced inasmuch as its operation is referenced against the aforesaid positional paper web indications.

These and other novel features of the invention, together with further objects and advantages thereof will become apparent from the following detailed specification with reference to the accompanying drawing in while the sole figure illustrates a preferred embodiment of the invention.

With reference now to the drawing, the reference numeral 10 designates the paper web which is to be imprinted. The paper web is divided into successive sheets by transverse rows of perforations 12 which permit the web to be folded in zig-zag fashion prior and subsequent to printing. In addition, the web is seen to have perforations 14 along the edges which are adapted to be engaged by the sprockets of a pair of sprocket belts 16, only one of which is visible in the drawing. For the sake of clarity and in order to conserve space, the central portion of the paper web has been omitted. Moreover, the relative sizes of the respective components of the apparatus illustrated in the drawing are not necessarily representative in order to permit the detailed illustration of all parts thereof.

Each of the sprocket belts 16 follows a closed path that is defined by a pair of pulleys 18 and 20. The driving pulley 18 is affixed to a drive shaft 22. The latter is adapted to be coupled to a drive motor 24 by means of an electrically actuated clutch 26. An electrically actuated brake 28 is adapted to arrest the motion of the drive shaft 22. An endless paper tape 30 follows a path defined by a pair of pulleys 32 and 34. The driving pulley 32 is coupled to the aforesaid drive shaft 22. The paper tape 30 is seen to contain two separate columns of perforations 36 and 38. A pair of light sources 40 and 42 are aligned with the holes of the columns 36 and 38 respectively. A pair of detecting means 44, e.g. a pair of photocells, is so arranged with respect to the light sources and the columnarly arranged paper tape perforations so as to detect the respective holes in each column and to provide an indicating signal in the form of a pulse in response to each. The indicating signals due to the holes 36 are designated as head-of-form–paper tape indications (HOF–PT), and the indicating signals due to the holes 38 are designated end-of-form–paper tape indications (EOF–PT).

A disc 46 is affixed to the aforesaid drive shaft 22 and contains a plurality of slots so arranged that the distance between each pair of slots corresponds to a line space interval of paper web movement. A light source 48 cooperates with a photocell 50 which is adapted to generate a line count advance pulse (LCA) for each slot of the disc 46 that moves into position.

As previously explained, in the preferred embodiment of the invention the information which is to be printed, as well as the formating instructions are derived from the output data of a computer. The central processor 52 of the computer is coupled to a printer control unit 53, its output being connected to a printer control memory 54 from which the print data is transferred to the printer. The aforesaid equipment may be of the kind disclosed in the above-mentioned copending applicatiton Serial Number 113,351. The formating instructions for each line, which are contained in a single control word, are applied to the formating apparatus. In a preferred organization for use with the line-by-line printer which is associated with the formating apparatus herein, the data is arranged by records. Each record contains a control word as the first word thereof and fifteen print data words. Depending on the particular requirements of the situation, some of the latter may be blank words which produce no printing. After the print data words of a particular record have been printed in a single line, vertical formating, as dictated by the control word in the same record, occurs to position the paper web for the print data of the subsequent record. Such formating, however, as explained in the aforesaid copending application Serial Number 113,351, is dependent upon the errorless completion of printing, as indicated in the drawing by the gating of a "Printing Complete" signal and a "No Error" signal ($\overline{\text{ERROR}}$) with the control word. It will be understood that the line count advance may be zero between respective records so that the information contained in separate records is printed on the same line. Such a procedure may be of advantage under certain conditions, e.g. where separate labels must be printed side by side.

As shown, the control word includes head-of-form instructions (HOF–CW), end-of-form instructions (EOF–CW), line count instructions (LC) and end-of-record instructions (ER). It will be appreciated that the appropriately labeled channels in the drawing which transfer the respective control word instructions, are schematically represented as single channels although more than one channel may be employed. It will also appear from the schematic gating representation of the "Printing Complete" signal in the drawing that the application of the control word instruction signals to the formating apparatus are dependent upon the completion of the printing of the previous line.

The end-of-record signal is fed back to the printer control unit 53 which transmits a status indication to the central processor 52 of the associated computing system. The line count signal LC is applied to the preset input of a line counter 56, the latter being an inverse counter which counts downward by one upon the receipt of each of the aforesaid line count advance pulses. In effect, the line counter performs a comparison between the number represented by the LC signal and the number of lines the paper web has advanced. False comparison signals are generated to continue the movement of the paper web until the count of 0 is reached. The counter further includes a line count reset input which is connected to the output of a buffer 58.

The end-of-form instruction signal EOF–CW is applied to the set input of a bistable circuit such as the flip-flop 60, whose reset input is connected to receive the aforesaid head-of-form indication signal HOF–PT. Flip-flop 60 further includes an assertive and a negative output, the assertive output providing a signal which is representative of a delayed end-of-form instruction signal, similarly designated EOF–CW. The latter signal is applied to a gate 62 which receives the end-of-form indication signal EOF–PT as an additional input. The output of the gate 62 is applied to the aforesaid buffer 58 together with the head-of-form instruction signal HOF–CW. The latter signal is further coupled to the input of a buffer 64 together with the output of the line counter 56. This line counter output will be referred to as the assertive output and is connected to provide a buffer input signal $\overline{LC=0}$, i.e. as long as the line count is not 0.

The assertive output of the flip-flop 60 is further connected to one input of a gate 61, the other input of which receives the signal EOF–PT. The output of the gate 61 is coupled to a buffer 63 together with the HOF–CW signal. It will be noted that the gates 61 and 62, as well as the buffers 58 and 63 respectively, receive identical logical arguments and hence they could be combined into a single gate-buffer configuration. In practice, however, unless signal amplification is provided, it is preferable to use separate gate-buffer configurations.

The output of the buffer 63 is connected to the set input of another bistable flip-flop 66 whose reset input receives the HOF–PT signal. The negative output of the flip-flop 66 which is designated $\overline{FF-66}$, is connected to one input of a gate 66, another gate input being connected to the negative output of the line counter so as to receive a gating signal $LC=0$, i.e. only when there is a zero line count. The assertive output of the flip-flop 66, which is designated FF–66, is connected to a gate 70 which receives as a further input the head-of-form indication signal HOF–PT.

The outputs of the gates 68 and 70 respectively are buffered together in a buffer 76 whose output is connected to the set input of a bistable flip-flop 78. The reset input of the latter flip-flop is connected to the output of a gate 80 which receives the output of the buffer 64 as one input thereof. The above-mentioned "Printing Complete" signal and the $\overline{ERROR}$ signal which is representative of the absence of any error during the previously printing, are additionally applied to the gate 80.

The assertive output signal of the flip-flop 78 which represents a delayed version of the signal applied to the set input indicative of an order to stop the motion of the paper web, is applied to the input of the brake 28 upon being amplified by an amplifier 82. The negative output signal of the flip-flop 78 which is representative of the signal applied to the reset input indicative of an order calling for motion of the paper web, is amplified in the amplifier 84 and applied to the clutch 26.

As previously explained, each data record, as it is received from the central processor 52 and is stored in the memory 54, consists of one control word and fifteen print data words. In the operation of the system, the print data words 2–16 of the record stored in the memory 54 are first read out and printed. Upon the completion of such printing without error, the readout of the first word, i.e. of the control word, is initiated. During this interval the end-of-record instruction signal ER is applied to the printer control unit 53 where it produces a busy indication and causes the related program in the central processor 52 to be turned off to suppress further printing.

The following table summarizes various situations which arise as dictated by the input conditions during the operation of the vertical formating apparatus under the joint control of the instruction and indication signals respectively.

Referring now to situation I–A, provided the conditions shown in columns 2, 6 and 7 of the table are true, the occurrence of a head-of-form instruction, as evidenced by an assertive HOF–CW signal, produces a signal at the output of the buffer 64 which is indicative of the fact that paper motion is called for. If prior printing was completed and there was no error, the gate 80 will apply an output signal to the reset input of the flip-flop 78 which results in the application of a corresponding delayed ONE signal to the clutch 26 and a ZERO signal to the brake 28. The energization of the clutch causes the latter to couple the drive motor 24 to the drive shaft 22 with the result that the motion of the paper web 10, of the paper tape 30 and of the slotted disc 46 is simultaneously initiated.

As indicated in the table above, the state of the signals EOF–CW, EOF–PT and LC is immaterial. The implementation of these conditions will be apparent from a consideration of the logical diagram of FIGURE 1. In situation I–A, moreover, the head-of-form indication signal HOF–PT will be 0. This is required by the mechanical operation of the system whereby the paper tape never stops directly on a hole but always beyond it. This condition is also required by the circuit logic, since otherwise, the gate 70 to which this signal is applied and which further receives the signal FF–66, will conduct and cause the flip-flop 78 to switch and energize the brake 28.

When the situation I–A prevails the movement of the paper web 10, having once started, will continue until a hole is sensed in column 36 by the detection means 44. The sensing of the hole in column 36 of the paper tape 30 produces a ONE pulse in the HOF–PT signal. Binary ONEs are then applied to both inputs of the gate 70 so as to render it conductive. The output of the gate 70 is applied to the buffer 76 to produce a buffer output signal which will switch the flip-flop 78 to the set state. A corresponding ONE output signal derived from the latter is amplified in the amplifier 82 and subsequently energizes the brake 28 to arrest the motion of the drive shaft 22, thereby halting the movement of the paper web, the paper tape and the disc 46. Simultaneously, since the other output of the flip-flop 78 reverts to ZERO, the clutch 26 is de-energized and the drive motor 24 is decoupled from the drive shaft. The HOF–PT signal further applies resetting pulses to both flip-flops 60 and 66. However, the inherent delay of the flip-flops prevents the resultant resetting action from affecting the above-described operation of gate 70. Inasmuch as the paper tape will overshoot the sensed hole, binary ZEROs are applied to both inputs of the gate 70 following the aforesaid operation.

When the conditions applicable to situation II–A in the table above occur, the signals HOF–CW and HOF–PT are both ZERO. The presence of a binary ONE in EOF–CW serves to set the flip-flop 60 so that a corre-

| Situation | 1<br>HOF-CW | 2<br>HOF-PT | 3<br>EOF-CW | 4<br>EOF-PT | 5<br>LC | 6<br>Error | 7<br>Printing Complete |
|---|---|---|---|---|---|---|---|
| I-A | ① | 0 | X | X | X | 0 | 1 |
| I-B | 1 | [1] | X | X | X | 0 | 1 |
| II-A | 0 | 0 | 1 | 1 | ① | 0 | 1 |
| II-B | 0 | [1] | 1 | 1 | X | 0 | 1 |
| III-A | 0 | 0 | X | 0 | ① | 0 | 1 |
| III-B | 0 | 0 | 0 | X | [0] | 0 | 1 |

1=Assertion of signal.
0=Negation of signal.
X=Immaterial.
○=Controls start of paper web motion.
□=Controls stop of paper web motion.

sponding signal is applied to the gates 61 and 62 respectively. As in the case of situation I–A, prior printing must have been completed without error. The occurrence of a line count instruction LC presets the line counter 56 so that the output signal of the latter, when buffered to the gate 80, results in the initiation of the paper web motion.

When a hole in column 38 is sensed by the detecting means 44, an EOF–PT signal is generated so as to gate output signals from the gates 61 and 62 to the buffers 63 and 58 respectively. The output signal from the buffer 58 serves to reset the line counter 56 to the count 0, while the output signal from the buffer 63 causes the flip-flop 66 to be set. No stop paper motion signal is generated by the gate 68 since the setting action of the flip-flop 66, upon the occurrence of the EOF–PT pulse, causes the signal $\overline{\text{FF–66}}$ to become ZERO. It will be noted that the bistable nature of the flip-flop 78 permits the paper web advance to continue even though the resetting action of the line counter serves to remove the ONE signal previously applied by the gate 80 to the reset input of the flip-flop 78. Stated differently, once the motion of the paper web is initiated, the condition of the line counter is immaterial. It will be understood that the gates 61 and 62 both revert to the nonconductive state subsequent to the occurrence of the EOF–PT pulse.

Situation II–B occurs when the above conditions prevail and a hole is sensed in column 36 of the paper tape. The resultant HOF–PT ONE pulse in conjunction with the signal FF–66 which is derived from the assertive output of the flip-flop 66, causes the gate 70 to conduct with the result that the buffer 76 applies an output signal to the set input of the flip-flop 78. This results in the energization of the brake 28 and the de-energization of the clutch 26 as previously explained, the paper tape advance producing overshoot so that the signal HOF–PT subsequently reverts to ZERO. As before, the occurrence HOF–PT ONE pulse resets the flip-flops 60 and 66.

Situation III–A exists when the instruction signal HOF–CW is ZERO. HOF–PT and EOF–PT are both ZERO owing to the aforesaid paper tape overshoot. Under these conditions the state of EOF–CW is immaterial. Upon the completion of prior printing the line counter 56 is reset to 0. The line count instruction signal LC presets the line counter to the number which corresponds to the required number of line spaces that the paper web is to be advanced.

The output signal of the line counter which now is greater than 0, is applied to the gate 80 via the buffer 64. The gate output signal in turn resets the flip-flop 78 if printing of the last line was completed without error. As before, this action initiates the movement of the drive shaft 22 and thereby that of the paper web 10, the paper tape 30 and of the slotted disc 46. The light source 48 and the detector 50 cooperate to generate a line count pulse whenever the advance of the disc 46 corresponds to one line space of the paper web 10. Each of the line count advance pulses advances the inverse line counter by one count, i.e. each pulse decreases its output by a count of 1.

Situation III–B obtains when the line count of 0 is reached so that an assertive output signal is no longer buffered to the gate 80. In order to ensure that the flip-flop 66 is in its reset condition, the signal EOF–CW must be ZERO. Under these conditions, the state of EOF–PT is immaterial. With the flip-flop 66 reset, the gate 68 which is energized by the $\overline{\text{FF–66}}$ signal and by the signal $LC=0$, now becomes active. The output signal of the buffer 76 causes the flip-flop 78 to set, thereby de-energizing the clutch 26, energizing the brake 28 and arresting th motion of the drive shaft 22.

If the vertical format is programmed entirely, i.e. if it is completely described in terms of line count instructions contained in the control word, the situations III–A and III–B will obtain. The line count instructions are preferably used where frequent changes of the format occur. In such a case the head-of-form and the end-of-form, which may refer to the beginning and end of a single paragraph for example, may best be formated by means of the number of line spaces required to advance to the desired positions.

A considerable simplification of the programmer's work is possible if there is a sufficient amount of repetition of the print format, either of successive forms or of the spacing of the lines within a given form. For example, it may be desired to double-space a certain number of lines within a given form regardless of variations in the remainder of the form. If the line count only is employed, the burden is on the programmer to program the proper line count data, considering at all times the last paper web position. Not only does this procedure require more of the programmer's time, but it also serves to occupy additional time of the central processor of the computer. Moreover, it lessens the reliability of the formating apparatus since no reference is had by the apparatus to the actual position of the paper web.

The lines it is desired to double-space may be punched as head-of-form indications on the paper tape 30. In this way the desired paper advance can be readily effected by means of situations I–A and I–B of the table above. Thus, a head-of-form instruction (HOF–CW) may be programmed which initiates the motion of the paper web and continues it until a head-of-form indication signal (HOF–PT) is obtained upon the arrival of a hole in column 36 of the paper tape 30 opposite the detector 44. It will be appreciated that the programming of a head-of-form instruction upon the satisfactory completion of printing of the previous line is a much simpler matter than the programming of the line count which will have to be computed by the central processor.

In a similar manner situation II indicates how an end-of-form indication and the control word may be jointly employed to condition the apparatus so that, once the paper web motion has been initiated, the arrival of a hole in channel 38 resulting in an end-of-form indication signal EOF–PT, will continue the advance of the paper web until a hole in column 36 is reached which results in an HOF–PT signal. It will be noted that the process which results when situation II prevails is somewhat similar to the operation of prior art apparatus of the kind using only paper tape to control the movement of the paper web. The important difference in the respective operations resides in the fact that the process of automatically moving the paper web to the head-of-form upon the occurrence of an end-of-form indication is conditioned upon the occurrence of an end-of-form instruction in the present invention. Where such an instruction exists and the aforesaid conditions are true, the process occurs automatically and the line count is ignored as immaterial. In the absence of an end-of-form instruction, the process does not occur automatically and the line count controls. The latter condition is indicated by situation III–B.

Thus, the invention provides far greater flexibility than was available heretofore in controlling the movement of the paper web for the purpose of vertical formating. For example, in a billing operation it may be desirable in the great majority of cases for the process dictated by situation II to occur. As a concrete example, the end-of-form indication (EOF–PT) may be representative of the last line on each print form and the head-of-form indication (HOF–PT) may represent the first line of a print form. Under ordinary conditions, when more space is required for a particular bill than is permitted by the length of the form as indicated by the end-of-form indication, printing of the bill will be continued at the head of the next form. This situation follows the process dictated by situation II.

On the other hand, a situation may occur when the completion of the bill requires only a few lines, or perhaps only a single line containing the sum total. A rigid adherence to the formating process resulting from the conditions of situation II will, under these circumstances, place the aforesaid sum total of the bill by itself at the head of the new form, while the bill proper appears on the preceding form. It is evidently desirable under these conditions to place the sum total together with the remaining data on the same form. Where the vertical formating process is entirely controlled by the paper tape, as is the case in prior art apparatus, such a change cannot be carried out without a special procedure which usually involves interrupting the printing operation. Sole reliance on the line count, on the other hand, while it readily permits modifications to be made, requires a considerable amount of computer and programming time for what is essentially a repetitive operation.

With the present invention, however, repetitive situations are handled efficiently by means of automatic programming instructions without giving up the flexibility required by such special situations as that described above. In the example under discussion, therefore, the invention affords the opportunity of suppressing the formating procedure which is dictated by the conditions of situation II, simply by changing the end-of-format instruction signal to ZERO. Under these conditions (situation III–B), the end-of-format indication is of no consequence since the line count instruction alone controls the formating process. Accordingly, if the actually available space permits the printing of one or more additional lines after the print line which corresponds to the end-of-format indication, such printing may be carried out on the same form by employing the line count instruction in the present invention.

From the foregoing description and illustration of a preferred embodiment of the invention, it will be clear that the invention is not limited to the specific features disclosed. For example, the particular clutch and brake arrangement which is shown in FIGURE 1 may be readily modified. Nor are sprocket belts required in order to move the paper web 10. By the same token, the head- and end-of-form indications respectively need not necessarily be provided by means of holes in a paper tape. It is only necessary that suitable indicia be provided which move in synchronism with the paper web and which are capable of being recognized at a reading station. Indeed, such indicia could be carried by the web itself. Similarly, the line count advance pulse need not be generated as shown in FIGURE 1. For example, means could be provided for magnetically recognizing suitable indicia spaced periodically at line space intervals about the disc 46. Here too, the paper web could be made to carry these indicia to obtain the LCA pulses.

The line count need not be carried out as shown, i.e. by means of an inverse line counter which is preset by the line count instructions and advanced by line count advance pulses. Basically, what is required is a comparison between the line count instruction and a signal representative of the extent of the paper web movement. As an example, the line count advance pulses could be used to operate an ordinary counter, the output of which is compared with the line count instruction.

The invention is not confined to apparatus for vertically formating a paper web that is to be imprinted with computer-derived data. The invention encompasses the formating of data on different kinds of data storage media by positioning the latter so that the data transfer will occur at the desired formating position. It will be obvious that the medium need not be stopped for the data transfer if the latter can be effected properly while the medium is in motion.

It will be apparent from the foregoing disclosure of the invention that numerous modifications, changes and equivalents will now occur to those skilled in the art, all of which fall within the true spirit and scope contemplated by the invention.

What is claimed is:

1. Formating apparatus for moving a web to selected print line positions, said web being sectioned to define repetitive predetermined forms respectively adapted to have internally derived data printed thereon, comprising means for deriving instruction signals relative to the head-of-form, the end-of-form and the line count of the data to be printed, a driving source, web transport means, a clutch selectively adapted to couple the motion of said driving source to said web through said transport means, a brake adapted to arrest said motion, said clutch and brake being connected for mutually exclusive energization, means synchronously movable with said web to derive signals indicative of said head- and end-of-form respectively as well as signals representative of the extent of web movement signal comparing means for deriving signals representative of true and false comparisons between said web advance signals and said line count instruction signals, and control circuit means including means for energizing said clutch upon the occurrence of at least one of said head-of-form instruction signal and said false comparison signal, means responsive to the occurrence of said end-of-form instruction and indicating signals to derive a coincidence signal, and means for energizing said brake upon the occurrence of said head-of-form indicating signal and at least one of said head-of-form instruction signal, said coincidence signal and said false comparison signal.

2. Formating apparatus for moving a data storage medium to selected line positions, said medium containing successive forms respectively adapted to have externally derived data transferred thereto, comprising means for deriving indicating signals for the head and end respectively of each of said forms on said medium, means for deriving instruction signals relative to the head-of-form, the end-of-form and the line count of the data to be transferred, means for deriving signals indicative of the line advance of said medium, signal comparing means for deriving signals indicative of true and false comparisons between said last-recited signals and said line count instruction signals, and transport control means including means for initiating the motion of said medium upon the occurrence of at least one of said head-of-form instruction signal and said false comparison signal, means responsive to the occurrence of said end-of-form instruction and indication signals to derive a coincidence signal, and means for arresting said medium motion upon the occurrence of said head-of-form indicating signal and at least one of said head-of-form instruction signal, said coincidence signal and said false comparison signal.

3. The apparatus of claim 2 wherein said externally derived data is organized into records, each of said records having control information associated therewith adapted to provide said instruction signals, said control information further including an end-of-record instruction adapted to interrupt the flow of said externally derived data.

4. The apparatus of claim 2 wherein said means for deriving head- and end-of-form indicating signals respectively comprises an endless type synchronously movable with said medium, said tape bearing indicia representative of the head and the end of said forms on said medium, and means for detecting said indicia.

5. The apparatus of claim 2 and further including a driving source, a clutch connected for selective energization from said transport control means to couple the motion of said driving source to said medium, and a brake connected for selective energization from said control means, said clutch and said brake being connected for mutually exclusive energization.

6. The apparatus of claim 2 wherein said signal comparing means comprises an inverse counter, means for presetting said counter with said line count instruction signal, means for advancing said counter with said line advance indicating signals, and means for resetting said counter with at least one of said head-of-form instruction signal and said coincidence signal.

7. The apparatus of claim 6 wherein said means for deriving said signals indicative of the line advance comprises a disc synchronously movable with said medium, said disc bearing indicia at line space intervals, and means for detecting said indicia.

8. In combination with a line-by-line printer for printing data on a movable paper web, said web containing successive forms respectively adapted to receive said data, vertical formating apparatus including web transport means for advancing said paper web to the desired print line, means for providing signal indications of the head and end respectively of said web forms, means for providing signal instructions pertaining to the head-of-form, the end-of-form and the line count of the data to be printed, said formating apparatus including means responsive to a head-of-form instruction to advance said web until a head-of-form indication is received, means responsive to a line count instruction in the absence of a head-of-form instruction to initiate the advance of said web, and means responsive to an end-of-form indication upon the occurrence of an end-of-form instruction to continue said last-recited advance until a head-of-form indication is obtained, means for deriving signal indication of the extent of the advance of said paper web, said formating apparatus further including means responsive to a true signal comparison of said last-recited indication and said line count instruction to arrest the line count-initiated advance of said paper web.

9. Formating apparatus for moving a medium to preselected data transfer positions, said medium containing successive forms respectively adapted to store data, comprising medium transport means, means for providing signal indications of the head and end respectively of a medium form, means for providing signal instructions pertaining to the head-of-form and the end-of-form of the data to be stored and to said preselected data transfer positions of said medium, control circuit means operatively coupled to said medium transport means, said control circuit means including means responsive to a head-of-form instruction to move said medium until a head-of-form indication is received, means responsive to a data transfer position instruction in the absence of head-of-form instruction to initiate the movement of said medium, and means responsive to an end-of-form indication upon the occurrence of an end-of-form instruction to continue said last-recited movement until a head-of-form indication is obtained, means for deriving signal indications of the extent of movement of said medium, said control circuit means further including means responsive to a true signal comparison of said last-recited indications and said preselected data transfer position instructions to arrest the movement of said medium initiated by said last-recited instructions.

10. In combination with apparatus for transferring data to a movable medium, said medium containing successive forms respectively adapted to store said data, formating means including medium transport means for controlling the relative movement of said medium and said data transfer apparatus to obtain preselected data transfer positons, means for providing signal indications of the head and end respectively of a form on said medium, means for providing signal instructions pertaining to the head-of-form and the end-of-form of the data to be stored and to said preselected data transfer positions, said formating means including means responsive to a head-of-form instruction to effect said relative movement until a head-of-form indication is received, means responsive to a data transfer position instruction in the absence of a head-of-form instruction to initiate said relative movement, and means responsive to an end-of-form indication upon the occurrence of an end-of-form instruction to continue said last-recited movement until a head-of-form indication is obtained, means for deriving signal indications of the extent of said relative movement, said formating means further including means responsive to a true signal comparison of said last-recited indications and said preselected data transfer position instructions to arrest said relative movement initiated by said last-recited instructions.

11. Formating apparatus for moving a web to selected print line positions, said web being sectioned to define repetitive predetermined forms respectively adapted to have externally derived data printed thereon, comprising web transport means, means for deriving indicating signals for the head and end respectively of each of said forms on said web, means for deriving instruction signals relative to the head-of-form, the end-of-form and the line count of the data to be printed, a control circuit including first bistable means adapted to be set by said end-of-form instruction signal to provide a corresponding signal at its assertive output, means for gating said last-recited signal with said end-of-form instruction signal to derive a coincidence signal, and second bistable means adapted to be set by at least one of said head-of-form instruction signal or said coincidence signal to provide a corresponding signal at its assertive output, each of said bistable means being adapted to be reset by said head-of-form indicating signal to provide a corresponding signal at its negative output, means for deriving signals indicative of the line advance of said web, said control circuit further including means for deriving signals indicative of true or false comparisons between said last-recited signals and said line count signals, means for initiating web motion upon the occurrence of at least one of said false comparison signal and said head-of-form instruction signal, and means for arresting said web motion at least upon the coincidence of the assertive output signal of said second bistable means and said head-of-form indication signal, or at least upon the coincidence of the negative output signal of said second bistable means and said true comparison signal.

12. In combination with a computer having a line-by-line printer associated therewith for printing computer output data on a movable paper web sectioned to define successive forms, said output data being organized into records each including an associated control word, vertical formating apparatus for moving said paper web the required number of line spaces to the line on which printing is to take place, comprising a paper feed motor, a clutch adapted to couple said motor to a drive shaft, a brake for arresting the motion of said drive shaft, a pair of sprocket belts energized from said drive shaft and adapted to engage matching perforations in said paper web, an endless paper tape including a pair of perforated columns indicative of the head and end respectively of said web forms, means for detecting said paper tape perforations to provide head-of-form and end-of-form indication signals respectively, means coupled to said drive shaft for moving said paper tape past said detection means, means coupled to said drive shaft for providing a pulse for each line space of paper web movement, a line counter having preset, reset and advance inputs respectively, said line counter advance input being connected for energization by said last-recited pulses, means for deriving instruction signals from said control word representative of head-of-form, end-of-form and line count instructions respectively, first and second flip-flops each having a reset input connected for energization by said head-of-form indication signal, the set input of said first flip-flop being connected for energization by said end-of-form instruction signal, first gating means for gating the assertive output of said first flip-flop with said end-of-form indication signal, first buffering means for buffering the output of said first gating means with said head-of-form instruction signal to the set input of said second flip-flop and to said reset input of said line counter respectively, second buffering means for buffering the assertive output of said line counter with said head-of-form instruction signal, second gating means for gating the negative output of said line counter with the negative output of said second flip-flop, third gating means for gating the assertive output of said second flip-flop with said head-of-form indication signal, third buffering means for buffering together the output of said second and third gating means, means for energizing said line counter preset input with said line count instruction signals, a control flip-flop, means for coupling the output of said second buffering means to the reset input of said control flip-flop, means for applying the output of said third buffering means to the set signal of said control flip-flop, and means for energizing said brake and clutch respectively with the assertive and negative output signals of said control flip-flop.

References Cited by the Examiner

UNITED STATES PATENTS 2,672,287 3/54 Reitfort ---------- 235—61.9 X
2,915,966 12/59 Jacoby.

WILLIAM B. PENN, *Primary Examiner.*

ROBERT A. LEIGHEY, *Examiner.*